(12) United States Patent
Boshove et al.

(10) Patent No.: US 12,024,908 B2
(45) Date of Patent: Jul. 2, 2024

(54) SPACER FOR FIXATION TO A CONSTRUCTION ELEMENT, FOR MAINTAINING A RELATIVE DISTANCE TO ANOTHER CONSTRUCTION ELEMENT, AND FOR RESTRICTING A MOVEMENT ABOUT A POSITION RELATIVE TO ANOTHER CONSTRUCTION ELEMENT

(71) Applicant: PR Licensing B.V., Vianen (NL)

(72) Inventors: Twan Boshove, Kloosterhaar (NL); Marcel Jager, Westerhaar-Vriezenveensewijk (NL)

(73) Assignee: PR Licensing B.V., Vianen (NL)

( * ) Notice: Subject to any disclaimer, the term of this patent is extended or adjusted under 35 U.S.C. 154(b) by 256 days.

(21) Appl. No.: 16/978,338

(22) PCT Filed: Mar. 5, 2019

(86) PCT No.: PCT/EP2019/055375
§ 371 (c)(1),
(2) Date: Sep. 4, 2020

(87) PCT Pub. No.: WO2019/170630
PCT Pub. Date: Sep. 12, 2019

(65) Prior Publication Data
US 2021/0002912 A1 Jan. 7, 2021

(30) Foreign Application Priority Data

Mar. 6, 2018 (NL) ..................... 1042777

(51) Int. Cl.
*E04G 21/18* (2006.01)
*E04B 2/02* (2006.01)
(52) U.S. Cl.
CPC ............ *E04G 21/1883* (2013.01); *E04B 2/02* (2013.01); *E04B 2002/0282* (2013.01)

(58) Field of Classification Search
CPC ........ E04B 1/6807; E04B 1/6815; E04B 1/68; E04B 2002/0282; E04B 1/36; E04B 2/02;
(Continued)

(56) References Cited

U.S. PATENT DOCUMENTS

| | | | | |
|---|---|---|---|---|
| 194,580 A | * | 8/1877 | Clark | ...................... E04B 1/681 52/393 |
| 2,132,499 A | * | 10/1938 | Tuthill | ................ E04F 13/0801 52/391 |

(Continued)

FOREIGN PATENT DOCUMENTS

| | | |
|---|---|---|
| BE | 637 148 A1 | 12/1963 |
| FR | 2 660 352 A1 | 10/1991 |

(Continued)

OTHER PUBLICATIONS

International Search Report and Written Opinion for International Application No. PCT/EP2019/055375, dated May 7, 2019.

(Continued)

*Primary Examiner* — Brian E Glessner
*Assistant Examiner* — Adam G Barlow
(74) *Attorney, Agent, or Firm* — Joseph T. Leone; DeWitt LLP

(57) ABSTRACT

A spacer for fixation to a construction element, for maintaining a relative distance to another construction element, and for restricting at the maintained distance a movement about a position that is relative to another construction element, the spacer having a structure that: a) provides resiliency and generates a force for enhancing a distance relative to another nearby construction element when distance to that other construction element is reduced to a predetermined distance, and b) provides restriction of a movement of the structure in at least one direction that is different from the direction of predetermined distance.

19 Claims, 8 Drawing Sheets

(a)

(b)

(58) Field of Classification Search
CPC .................. E04F 15/08; E04F 15/02005; E04G 21/1883; F16F 1/18
USPC .................. 52/167.1, 393–396.1, 573.1
See application file for complete search history.

(56) References Cited

U.S. PATENT DOCUMENTS

| | | | | |
|---|---|---|---|---|
| 2,241,822 A * | 5/1941 | Marsh | ............ | B65D 90/12 52/261 |
| 2,504,701 A * | 4/1950 | Krantz | ............ | E06B 3/605 52/204.56 |
| 2,743,487 A * | 5/1956 | Kuhlman | ............ | E04F 15/225 52/480 |
| 3,102,612 A * | 9/1963 | Dunnington | ............ | E04B 1/6175 52/464 |
| 3,172,237 A * | 3/1965 | Bradley | ............ | E01C 11/106 52/99 |
| 3,344,720 A | 10/1967 | Hallock | | |
| 3,390,501 A * | 7/1968 | Driggers | ............ | E04B 1/6804 52/367 |
| 3,435,574 A * | 4/1969 | Hallock | ............ | E04B 1/6803 404/69 |
| 3,555,755 A * | 1/1971 | Reed, III | ............ | E04D 3/06 52/553 |
| 3,611,653 A * | 10/1971 | Zinn | ............ | E04B 2/7412 52/407.3 |
| 4,187,573 A * | 2/1980 | Fyfe | ............ | E01D 19/041 248/580 |
| 4,281,494 A * | 8/1981 | Weinar | ............ | E04B 2/7411 52/509 |
| 4,362,428 A * | 12/1982 | Kerschner | ............ | E01C 11/106 49/498.1 |
| 4,474,729 A * | 10/1984 | Schoening | ............ | E04B 1/36 376/285 |
| 4,713,917 A * | 12/1987 | Buckle | ............ | E01D 19/041 248/565 |
| 4,899,323 A * | 2/1990 | Fukahori | ............ | E04B 1/36 248/560 |
| 5,214,891 A * | 6/1993 | Edlin | ............ | E06B 9/521 160/327 |
| 5,388,380 A * | 2/1995 | Niese | ............ | E04F 15/22 52/480 |
| 5,761,856 A * | 6/1998 | Kishizono | ............ | E04H 9/022 52/573.1 |
| 5,765,322 A * | 6/1998 | Kubo | ............ | E04H 9/022 248/634 |
| 5,887,400 A * | 3/1999 | Bratek | ............ | E04B 1/681 52/573.1 |
| 5,946,866 A * | 9/1999 | Weglewski | ............ | F16F 1/40 52/167.7 |
| 6,532,708 B1 * | 3/2003 | Baerveldt | ............ | E04B 1/6804 404/47 |
| 7,596,921 B1 | 10/2009 | diGirolamo et al. | | |
| 7,856,766 B2 * | 12/2010 | Takenoshita | ............ | F16F 7/08 52/167.7 |
| 8,117,788 B1 * | 2/2012 | Mueller | ............ | E04H 9/0237 52/573.1 |
| 8,464,485 B2 * | 6/2013 | Hilburn | ............ | E04B 1/948 52/394 |
| 8,578,671 B2 * | 11/2013 | Labrecque | ............ | E04B 2/967 52/235 |
| 8,607,519 B2 * | 12/2013 | Hilburn | ............ | E04B 2/7457 52/394 |
| 8,646,235 B2 * | 2/2014 | Hilburn, Jr. | ............ | E04B 1/948 52/394 |
| 8,668,968 B2 * | 3/2014 | Wakana | ............ | F16F 1/40 428/323 |
| 8,746,648 B1 | 6/2014 | Godina et al. | | |
| 8,826,481 B1 * | 9/2014 | Haydu | ............ | E01D 19/005 404/69 |
| 9,038,335 B1 * | 5/2015 | Eck | ............ | E06B 1/6061 52/204.597 |
| 9,085,896 B2 * | 7/2015 | Tsai | ............ | E04B 1/98 |
| 9,528,262 B2 * | 12/2016 | Witherspoon | ............ | C08J 9/365 |
| 2005/0066600 A1 * | 3/2005 | Moulton | ............ | E01D 19/06 52/393 |
| 2008/0090057 A1 * | 4/2008 | Suzuki | ............ | F16F 1/40 428/212 |
| 2014/0157703 A1 * | 6/2014 | Hunke | ............ | E01D 19/06 52/395 |
| 2015/0292213 A1 * | 10/2015 | Oliver | ............ | E04F 13/081 52/506.05 |
| 2016/0017597 A1 * | 1/2016 | Holtschmidt | ............ | E04F 13/08 52/394 |
| 2017/0268689 A1 | 9/2017 | Ohki | | |
| 2021/0002912 A1 * | 1/2021 | Boshove | ............ | E04B 2/02 |

FOREIGN PATENT DOCUMENTS

| | | |
|---|---|---|
| GB | 2 148 358 A1 | 5/1985 |
| KR | 10-1385154 B1 | 4/2014 |
| WO | 2016/185432 A1 | 11/2016 |

OTHER PUBLICATIONS

Ch. II International Preliminary Report on Patentability for International Application No. PCT/EP2019/055375, dated Jul. 9, 2020.

* cited by examiner

SPACER FOR FIXATION TO A CONSTRUCTION ELEMENT, FOR MAINTAINING A RELATIVE DISTANCE TO ANOTHER CONSTRUCTION ELEMENT, AND FOR RESTRICTING A MOVEMENT ABOUT A POSITION RELATIVE TO ANOTHER CONSTRUCTION ELEMENT

RELATED APPLICATIONS

This Application is a national stage filing under 35 U.S.C. § 371 of International Patent Application Serial No. PCT/EP2019/055375, filed Mar. 5, 2019, claiming foreign priority benefits of Dutch application number 1042777, filed Mar. 6, 2018, each is herein incorporated by reference in its entirety.

The present disclosure relates to a spacer for fixation to a construction element, for maintaining a relative distance to another construction element, and for restricting at the maintained distance a movement about a position that is relative to another construction element.

Spacers between construction elements are well-known. It is the very function of the spacer to maintain a distance between the two construction elements. Particularly where construction elements not only need to be kept at a relative distance from each other but also need to allow for certain relative movements between each other, it is often difficult to combine in a single spacer structure that combines these two functions.

In this context, construction elements may be panels which may be placed against facades of high buildings that are in terms of the load-bearing construction for instance made of steel, and need to allow for a slight bending of the building during heavy winds. Construction elements in the context of the disclosure may alternatively be floating elements that need to be connected up for providing a floating road running from one side of a river or channel to another side of that river or channel. One may also think of infiltration units that are placed in the ground, for instance under pavements or roads, and that may due to differently applied loads, for instance due to traffic, move relative to each other. So far, reference has been made to elements that change a little in shape due to bending of the construction elements. One can also think of construction elements which may alternative to bending, or in addition to bending, be heated up and thermally expand, equally or unequally. The construction elements referred to have in common that these together need to provide an ongoing relatively flat surface that overspans the dimensions of a single construction element and remain a large flat surface, despite slight deformations and/or relative displacements of the construction elements.

The present disclosure aims to provide a spacer that is suitable for at least one of above purposes.

SUMMARY OF THE DISCLOSURE

Provided is a spacer for fixation to a construction element for maintaining a relative distance to another construction element, and for restricting at the maintained distance a movement about a position that is relative to another construction element. The proposed spacer has a structure that:
a) provides resiliency and generates a force for enhancing a distance relative to another nearby construction element when the distance to that other construction element is reduced to less than a predetermined distance, and
b) provides restriction of a movement in at least one direction that is different from the direction of predetermining a distance.

Each of the construction elements referred to may have in common with any of the other construction elements that together, when put adjacent to each other, the construction elements may provide a relatively large flat surface that overspans the dimensions of the single construction elements, wherein the relatively large surface can despite slight deformations and/or relative displacements of the construction elements be maintained flat due to the role of the spacer.

Advantageously, whilst maintaining a distance some movement in at least one other direction is still allowed for, albeit to a restricted extent. Accordingly, in use of such a structure between two construction elements it may be possible to maintain the overall appearance and functionality of a large flat surface that is offered by a plurality of surface parts as provided by a number of construction elements, despite some relative movement between the construction elements.

The phrasing "spacer for fixation" encompasses a spacer that is an individual entity that is suitable for fixation, by means of a mechanical connection, a welding connection or a gluing connection. However, the phrasing also embraces a situation in which a spacer concerns an integrally fixed part of a construction element.

In a number of embodiments, the spacer is configured such that in use of the spacer the force for enhancing a distance to that other construction element is predominantly directed across the direction of the gravity.

In an embodiment, the structure comprises a resilient element and/or the structure comprises a restrictor for restricting the movement. In a number of embodiments, the resilient element has a shape that differs from a coil-shape. This allows for a spacer that can be more easily produced and maintained. In an embodiment the restrictor and the resilient element are spatially separated different elements of the structure. As discussed below in more detail, this allows for having the spacer fixed to a construction element, and for interacting of spacers of different construction elements.

In another embodiment, the restrictor and the resilient element are directly connected to each other and each embodied in one and the same single element of the structure. This allows for a single spacer between two construction elements, for instance fixed to at least one of the construction elements. For instance, the restrictor may be provided on the resilient element and as such form together a single element. In such an embodiment, it is possible that the restrictor is provided with an abutment surface for abutting a part of another construction element, and wherein the abutment surface is provided with a suction cup or a high friction surface for firmly fixing the restrictor relative to another construction element whilst abutting that other construction element.

Alternatively, in an embodiment the structure is provided with at least one resilient element and at least one restrictor which are spatially separated different parts of the structure, i.e. not directly connected. This allows in case of use of two spacers between construction elements to interaction for instance between the resilient element of one spacer with the restrictor of another spacer.

In general, the structure may be provided with a plurality of resilient elements and a plurality of restrictors. The resilient elements and the restrictors may have positions in the structure which alternate each other along a dimension of the structure, such as along the longitudinal direction of the spacer. This promotes functionality and compactness, and offers the interaction as described above for two spacers.

In an embodiment, the structure may be fixed, or fixable, to a slab-shaped construction element having two main surfaces and a rim between the two main surfaces. The structure may be positioned, or may be positionable, at the rim for maintaining a relative distance to a rim of an adjacent slab-shaped construction element, and for reducing at a maintained distance a movement of the rim about a position relative to a rim of an adjacent slab-shaped construction element. When the structure is fixed to a slab-shaped construction element, it may be an integral part of the construction element, for instance as a result of a single moulding process for producing a single product. It is also conceivable that the structure has been fixed to the slab-shaped construction element by means of a mechanical fixation, or for instance a welding process. After welding the structure may also be considered to be an integral part of the construction element.

In an embodiment, at least one of the resilient elements is pawl-shaped. Preferably, each resilient element is pawl-shaped. The resilient element may have a free end at or close to a part of the structure that is in use of the structure at the rim or close to one of the main surfaces. In such an embodiment, the free end may be at the predetermined distance, that is, the position of the free end, in unstrained condition of the resilient element, co-defines the predetermined distance. In such an embodiment, preferably the free end is at the trailing end of the pawl-shaped element for placing the slab-shaped construction element adjacent an end-positioned other slab-shaped construction element. The trailing end is a part of the structure that is in time only toward the end of the placement adjacent to the end-positioned other slab-shaped construction element, as opposed to a part of the resilient element that is away from the free end and that is in time already at the beginning of the placement adjacent to the end-positioned other slab-shaped construction element. This allows for placing a slab-shaped construction element having fixed to the rim the spacer, by means of a single translationary movement. For instance, a slab-shaped construction element can be held parallel and offset to another slab-shaped construction element that has already reached its end-position. From the parallel position the slab-shaped construction element that is still to be placed adjacent the end-positioned slab-shaped construction element just needs to be positioned so that the pawl-shaped resilient element slightly overlaps, or is about to slightly overlap with the end positioned slab-shaped construction element, to then be "shifted" in a transverse direction for "slotting" into a position that is adjacent the already end-positioned slab-shaped construction element. The pawl-shaped resilient element will, if necessary, then due to its orientation and resiliency easily give way and not obstruct or resist placement of the construction element.

In an embodiment, the restrictor is designed for blocking movement of a free end of a pawl-shaped resilient element of a structure that is fixed to a rim of an adjacent slab-shaped construction element. That is, the blocking element will, once the pawl-shaped resilient element has obtained a position adjacent the rim of an already end-positioned slab-shaped construction element, block the free end so as to prevent the pawl-shaped resilient element and thus the structure to which it belongs, from moving backwards out of the "slotted" position adjacent the already end-positioned slab-shaped construction element.

In an embodiment, the blocking element is a trailing end of the structure for placing the slab-shaped construction element adjacent to another already end-positioned slab-shaped construction element such that the trailing end is a part of the structure that is in time only toward the end of the placement adjacent to the other slab-shaped construction element, as opposed to a part of the structure that is away from the trailing end and that is in time already at the beginning of the placement adjacent to the end-positioned other slab-shaped construction element. This allows for optimal use of a pawl-shaped resilient element, wherein "slotting-in" experiences relatively little resistance. This can for instance be achieved by a relatively long pawl-shaped resilient element. It allows for the placement of a slab-shaped construction element and formation of a relatively small gap between the resulting two adjacent slab-shaped construction elements.

In an embodiment, the spacer is one of the spacers of an assembly having at least two of such spacers. Another way of putting this; the disclosure is also directed to an assembly of at least two spacers. Thus, according to an aspect of the present disclosure there is provided an assembly comprising at least two spacers. The spacers may be fixable, each to another slab-shaped construction element. The spacers may also each have been fixed to a slab-shaped construction element. In an embodiment, the structure of each spacer is provided with a plurality of resilient elements and a plurality of restrictors for restricting the movement. The resilient elements and the restrictors of a respective structure preferably alternate each other in a longitudinal direction of that structure. Advantageously, this allows for an embodiment in which the structure of each spacer is such that it allows for positioning a structure in a mating condition with a structure of another spacer of the assembly. Preferably, in the mating condition, the resilient element of the structure of one spacer is opposite and interacting with the restrictor of the structure of another spacer of the assembly.

It may be possible that a single worker can place a construction element next to an already end-positioned construction element, and easily without further guidance by other co-workers or equipment correctly align the construction elements so as to form together a larger surface. In that way a single worker can over a little time build up a large relatively flat surface that overspans many times the dimensions of a single construction element.

In an embodiment, the structure is provided with a guiding track and with a counter track for interacting with the guiding track, such that on bringing the structure of one spacer into the mating position with the structure of another spacer, the structure first can be put under an angle relative to the other structure and be put in contact, to then let the counter track interact with the guiding track for reaching the mating condition. Advantageously, due to the possibility that the structures of the respective spacers can be put under an angle before entering into a mating condition, it may be much easier to position and see the positioning of the structure relative to the other structure. Accordingly, the convenience in use of the spacer assembly when building out of a plurality of slab-shaped construction elements a large surface, is enhanced.

In an embodiment, the structure is such that in a mating position the structure of one of the spacers is locked into the mating condition with the structure of another one of the spacers. Accordingly, the spacers are not only suitable for maintaining a relative distance to another construction element, but also for forming a connection between adjacently slab-shaped construction elements (to which spacers have been fixed for carrying out a function in a gap between the adjacent slab-shaped construction elements).

In an embodiment, the structure is such that in the mating condition, the structure is in a mechanically releasable condition. Accordingly, the locked condition may be reversible, and the spacers can also fulfil a function where a large surface needs to be built by means of adjacent slab-shaped construction elements for temporary use only. For instance, temporary roads or a podium can swiftly be built up, but also swiftly be taken apart without having to destruct parts of it, i.e. without having to saw or burn through parts.

In an embodiment, the structure is provided with a plate-shaped element that in the mating condition extends from a trailing end of the structure and that in the mating condition at least to an extent covers a gap formed by distance between the mating structures. Advantageously, the plate-shaped element can form an extension of the larger surface which is intended to be built by means of putting a plurality of adjacent slab-shaped construction elements together. The plate-shaped element reduces the size, i.e. the width, of an interruption of that large surface. Furthermore, other elements of the structure of each spacer are protected. The chance that much dirt or large elements of rubbish find their way into the gap is also reduced. It is not inconceivable that the plate-shaped element and the restrictor are embodied in the very same element.

In an embodiment, the plate-shaped element has an outer surface, and wherein in a mating condition a restricted movement is possible parallel to the outer surface. In an embodiment, in the mating condition, the outer surfaces of the plate-shaped elements that belong to the mating structures remain in the same plane. Advantageously, no step formation occurs.

The disclosure is further described in more detail by means of non-limiting examples and with reference to a drawing in which, FIGS. 1(*a*) and 1(*b*) show a first embodiment of a spacer according to the present disclosure in use;

FIGS. 2(*a*) and 2(*b*) show a second embodiment of a spacer according to the present disclosure in use FIG. 3 show a third embodiment of a spacer according to the present disclosure in use;

FIG. 4(*a*) and FIG. 4(*b*) show a fourth embodiment of a spacer according to the present disclosure in use;

FIGS. 5(*a*), 5(*b*) and 5(*c*) show a fifth embodiment of a spacer according to the present disclosure in use;

FIGS. 6(*a*) and 6(*b*) show a sixth embodiment of a spacer according to the present disclosure in use;

FIGS. 7(*a*) and 7(*b*) show a seventh embodiment of a spacer according to the present disclosure in use;

FIGS. 8(*a*) and 8(*b*) show a eighth embodiment of a spacer according to the present disclosure in use.

In the drawing, like parts are provided with like references.

Figure 1:
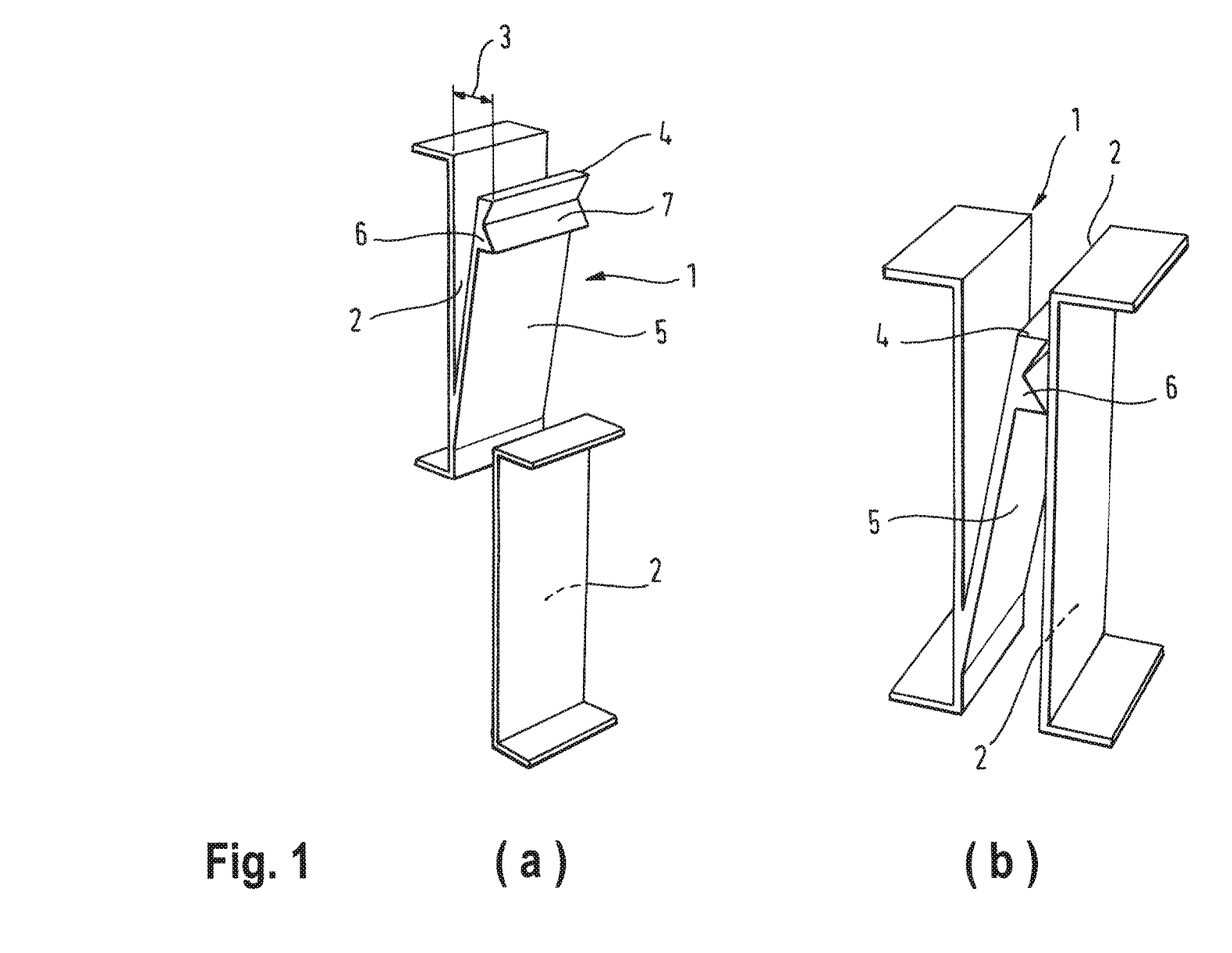

FIG. 1 shows a first embodiment of a spacer 1 for fixation to a construction element (of which only a rim 2 is shown). In FIGS. 1(*a*) and (*b*) the spacer 1 is shown in a perspective view. Spacer 1 has a part that could be considered similar, if not identical, to rim 2 of a construction element. It is clear from FIG. 1(*b*) that spacer 1 is capable of maintaining a relative distance to another construction element. The structure provides resiliency and generates a force for enhancing a distance relative to another nearby construction element when the distance to that other construction element is reduced to a predetermined distance 3. The structure comprises a resilient element 5. As clearly seen in each of FIG. 1(*a*) and FIG. 1(*b*), spacer 1 has a free end 4, in this example at the end of the resilient element 5. The predetermined distance 3 may thus be seen to be co-defined by the position of the free end 4 (when the resilient element is in an unconstrained condition as shown in FIG. 1(*a*)). Naturally, the predetermined distance 3 is further co-defined by the position of the rim of the construction element. In many examples co-defining the predetermined distance can be on the basis of a part 2 of the spacer 1 that could be considered similar, if not identical, to a rim 2 of a construction element (not shown). When, as shown in FIG. 1(*b*) rim 2 of another construction element reaches the construction element to which the spacer is fixed, within the distance that is less than the predetermined distance 3, then the resilient element 5 will generate a force that enhances the distance to the other nearby construction element. For the sake of completeness, the spacer comprises thus a part 2 that either corresponds to a rim of a slab-shaped construction element or can be fixed to a rim of a slab-shaped construction element, wherein that part together with the free end co-defines the predetermined distance.

The structure of spacer 1 also comprises a restrictor 6. In the embodiment shown in FIG. 1 the restrictor 6 and the resilient element 5 are directly connected to each other and each embodied in one and the same single element of the structure. In fact, in FIG. 1 the restrictor 6 is provided on the resilient element 5. The restrictor 5 is provided with an abutment surface 7 for abutting a part of another construction element 2. The abutment surface 7 may be provided with a suction cup (only schematically shown) for firmly fixing the restrictor 5 relative to another construction element 2 whilst abutting that other construction element 2, as shown in FIG. 1(*b*). In general, clearly, spacer 1 has a structure that provides restriction of a movement of the structure in at least one direction that is different from the direction of predetermined distance 3. The structure accordingly provides restriction of a movement of the structure in at least one direction that is different from the direction of predetermined distance.

Figure 2:
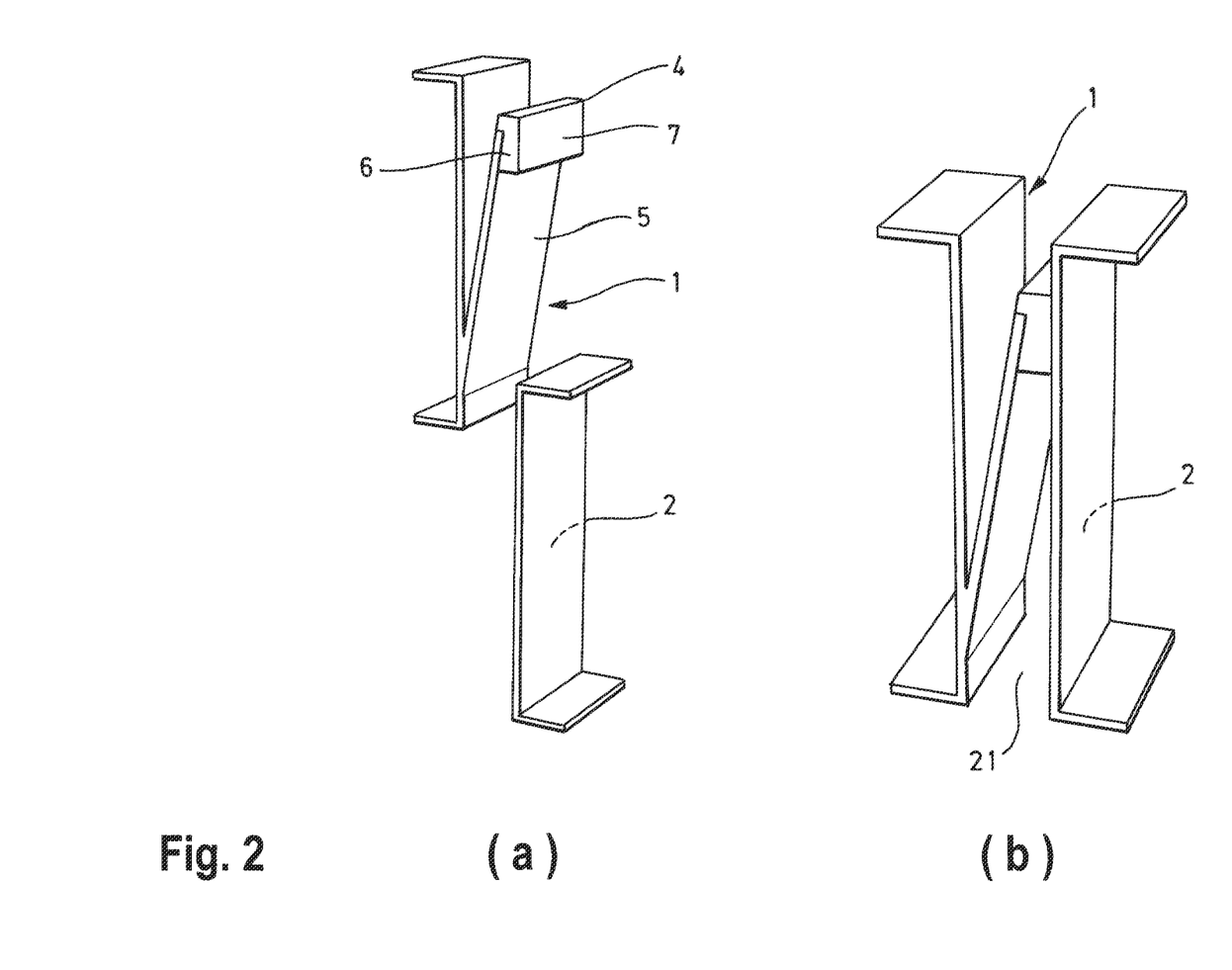

FIG. 2 shows a second embodiment of a spacer 1, almost identical to the embodiment shown in FIG. 1. The main difference is that instead of a suction cup, a high-friction surface is used as abutment surface 7.

Figure 3:
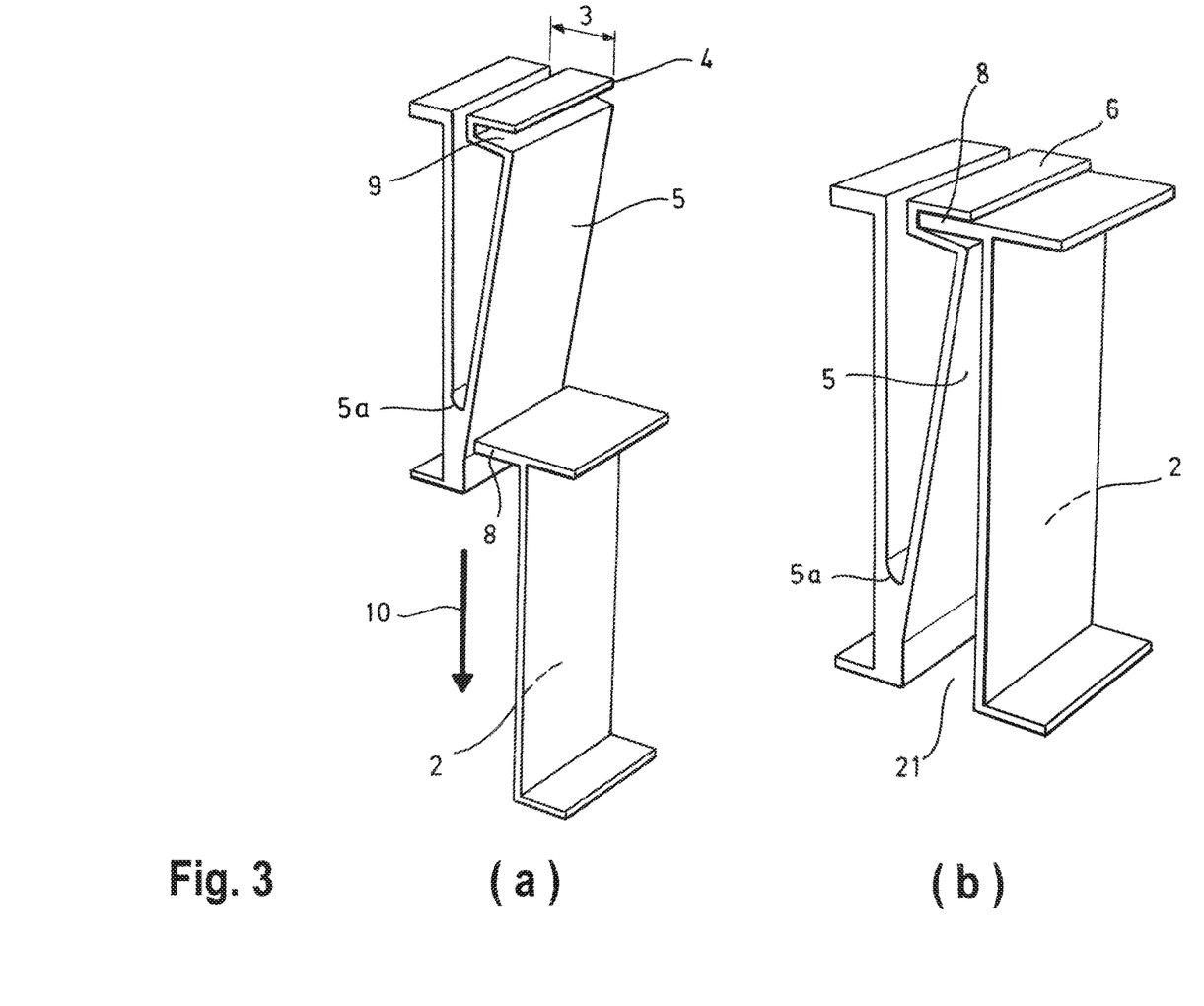

FIG. 3 shows a third embodiment of a spacer 1 for fixation to a construction element. This embodiment differs from the first and second embodiments respectively, as shown in FIGS. 1 and 2, in a number of aspects. Spacer 1 is suitable for working together with a construction element as provided with a plate-shaped element 8 extending from a rim of the plate-shaped construction element in a direction that corresponds to the direction of the predetermined distance 3 of spacer 1. In this embodiment, restrictor 6 is not provided with an abutment surface 7, but rather with a groove 9 for housing plate-shaped element 8 of the predominantly slab-shaped construction element (of which only rim 2 is shown).

FIG. 3(*a*) shows an arrow 10 indicating that the spacer 1 can be put in the position as shown and then be slided in the direction of arrow 10 to adopt a position as shown in FIG. 3(*b*). It should be assumed that the slab-shaped construction element of which only rim 2 is shown has reached its "end position" such that it will firmly hold to that position. When spacer 1 is slid down in the direction of arrow 10, resilient element 5 will give way and basically flexes toward the part 2 to which it is connected so as to allow for passing along the rim 2 of the end-positioned slab-shaped restriction element. Once groove 9 is at the level of plate-shaped element 8, then resilient element 5 will flex back towards the end-positioned slab-shaped construction element and house plate-shaped element 8, as shown in FIG. 2(*b*). As such, movement of the structure in a direction different from the direction of the predetermined distance is restricted. In fact, in this situation, movement is restricted in a direction that is perpendicular to the plate surface of the plate-shaped element 8.

Figure 4:
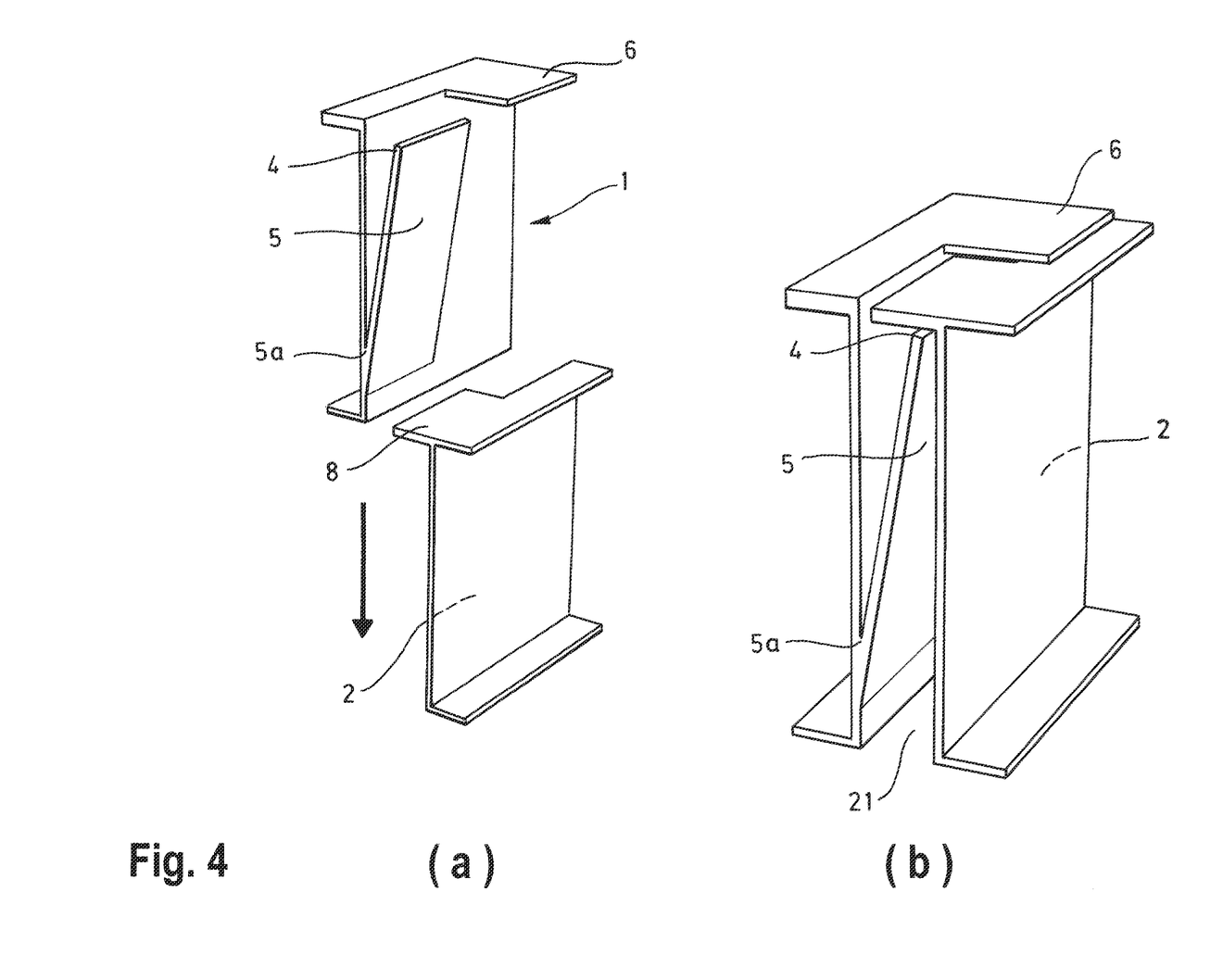

FIG. 4(*a*) and FIG. 4(*b*) show a fourth embodiment that differs from the third embodiment mainly in that the structure is provided with a resilient element 5 and a restrictor 6 which are each spatially separated different parts of the structure. Again, there is interaction with a plate-shaped element 8 provided at the rim 2 of a slab-shaped construction element that has already taken an end position.

Figure 5:
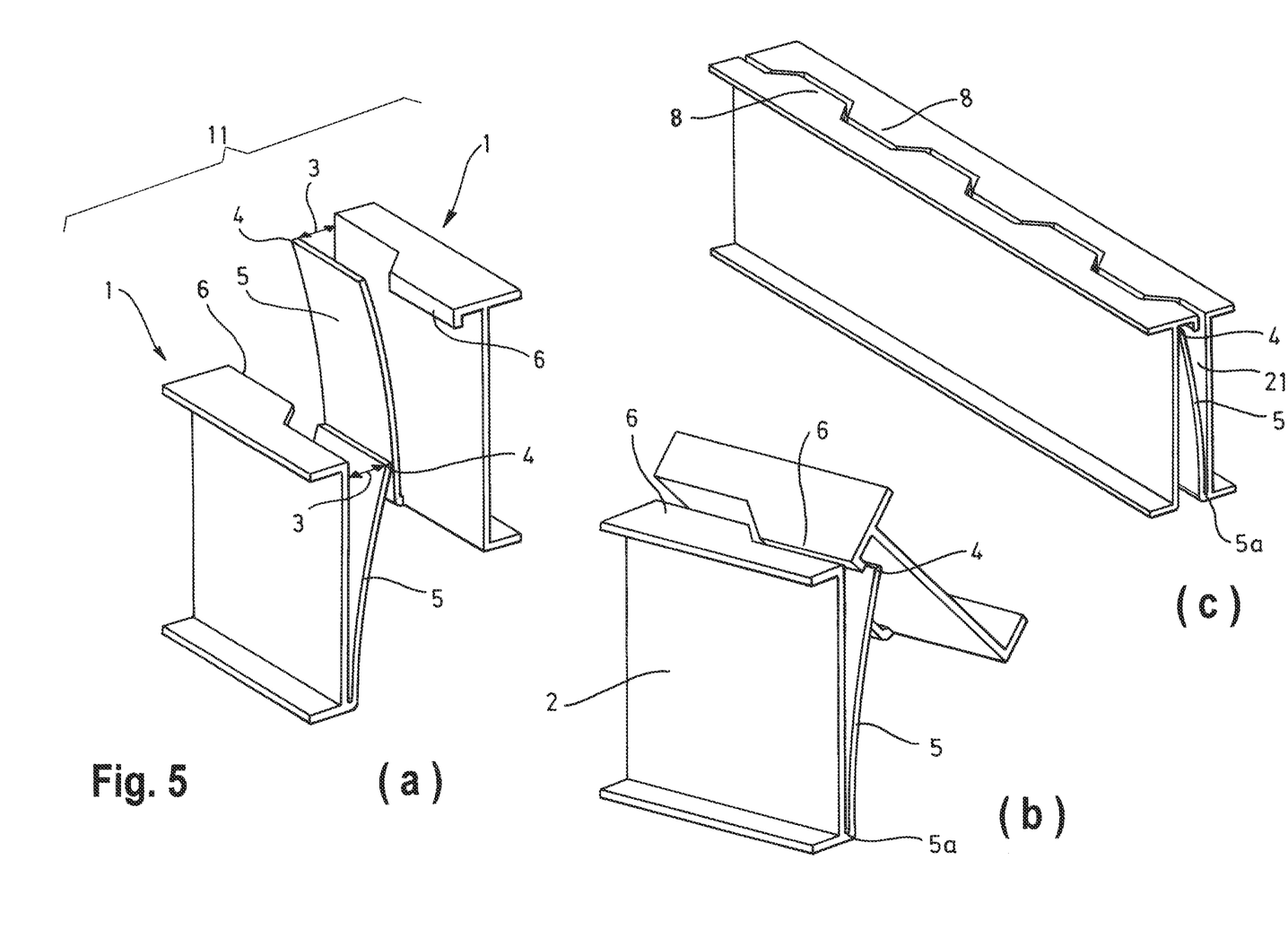

FIG. 5 shows a fifth embodiment of a spacer according to the present disclosure. Also for this embodiment it applies that the restrictor 6 and the resilient element 5 are spatially separated different elements of the structure. Although for the sake of clarity, in FIG. 5(*a*) and FIG. 5(*b*) spacers having just one restrictor 6 and one resilient element 5 are shown, as shown in FIG. 5(*c*) it is conceivable that a structure is provided with a plurality of resilient elements 5 and a plurality of restrictors 6. Although not clearly seen in FIG. 5(*c*), as more clearly seen in FIGS. 6 and 7, the positions of the resilient elements 5 and of the restrictor 6 alternate each other along a longitudinal dimension of the structure.

As briefly outlined above, the structure of the spacer is fixed or fixable to a slab-shaped construction element having two main surfaces and a rim 2 between the two main surfaces (not shown to the full extent). The structure is positioned or positionable at the rim for maintaining a relative distance to a rim 2 of an adjacent slab-shaped construction element. As for all the previously shown embodiments, the structure is suitable for restricting at a maintained distance a movement of the rim about a position that is relative to a rim of an adjacent slab-shaped construction element. As also shown in the previously discussed embodiments, the resilient element may be pawl-shaped. Where there is a plurality of resilient elements 5, this may apply to one of the resilient elements 5, but preferably to each of the resilient elements 5. The resilient element 5 has a free end 4. The free end 4 co-defines the predetermined distance 3, notably, the pawl-shaped element is connected at a hinge-end 5*a* of the structure. This is not a pivotal point but rather a stiff hinging point, that is in use subjected to bending. The hinge-end 5*a* coincides with a part of the structure that borders a rim of a slab-shaped construction element or is placeable or placed at a rim of a slab-shaped construction element.

As touched on when discussing the embodiments shown in FIGS. 3 and 4, the free end 4 may be a trailing end of the pole-shaped element 5 for placing the slab-shaped construction element adjacent to an end-positioned other slab-shaped construction element such that the trailing end is a part of the structure that is in time only toward the end of the placement adjacent to the end-positioned other slab-shaped construction element. This as opposed to a part of the resilient element 5 that is away from the free end 4 and that is in time already at the beginning of the placement adjacent to the end-positioned other slab-shaped construction element. The part of the resilient element 5 that is away from the free end 4 is in this example the hinge-end 5*a*.

The restrictor 6 may be designed for blocking movement of a free end 4 of a pawl-shaped resilient element 5 of the structure that is fixed to a rim of an adjacent slab-shaped construction element. Such a blocking element may equally be a trailing end of the structure for placing the slab-shaped construction element adjacent to another already end-positioned slab-shaped construction element such that the trailing end is a part of the structure that is in time only toward the end of the placement adjacent to the other end-positioned slab-shaped construction element. This is a trailing end as opposed to a part of the structure that is away from the trailing end and that is in time already at the beginning of the placement adjacent to the end-positioned other slab-shaped construction element.

Figure 7:
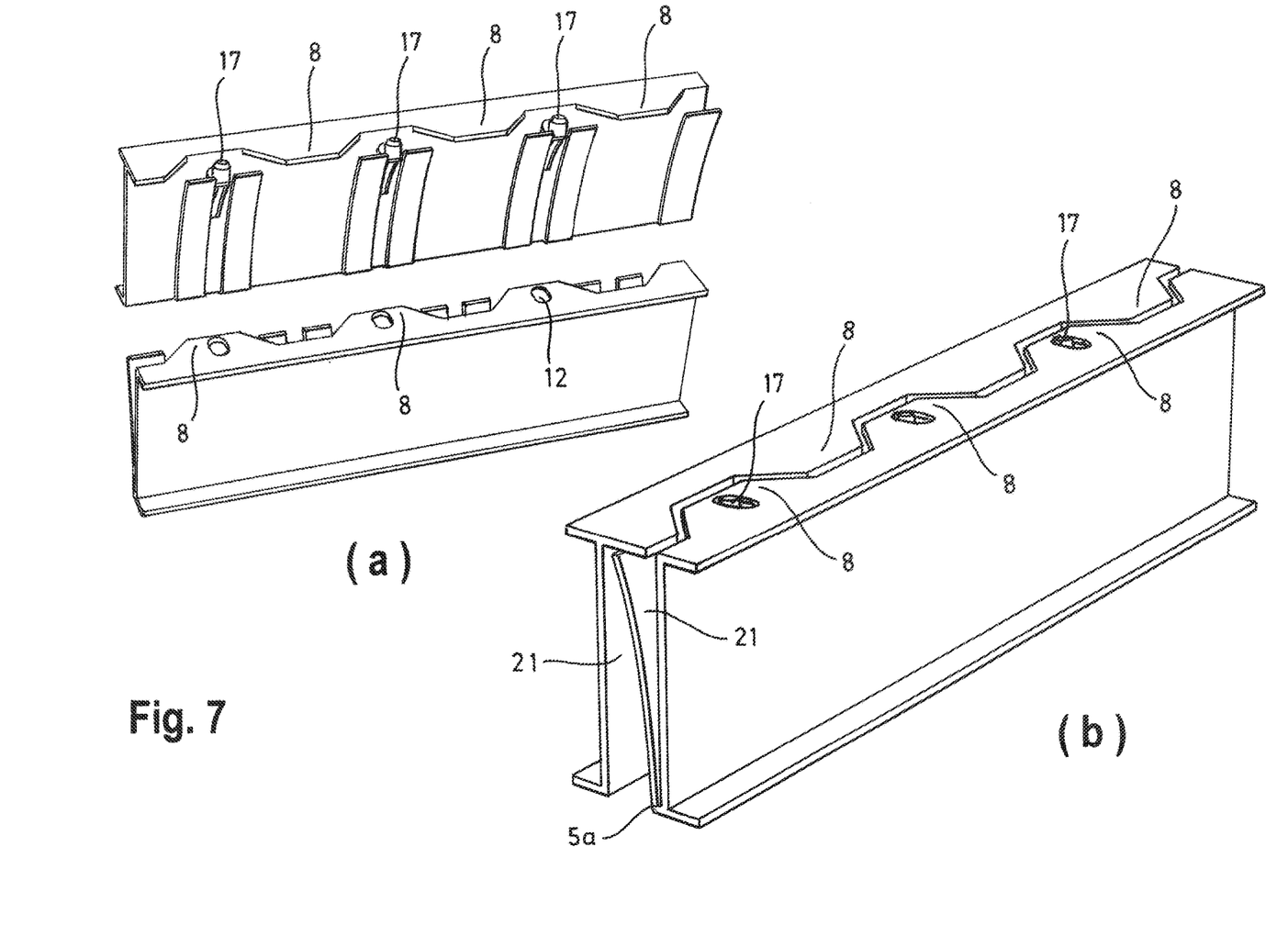
Figure 8:
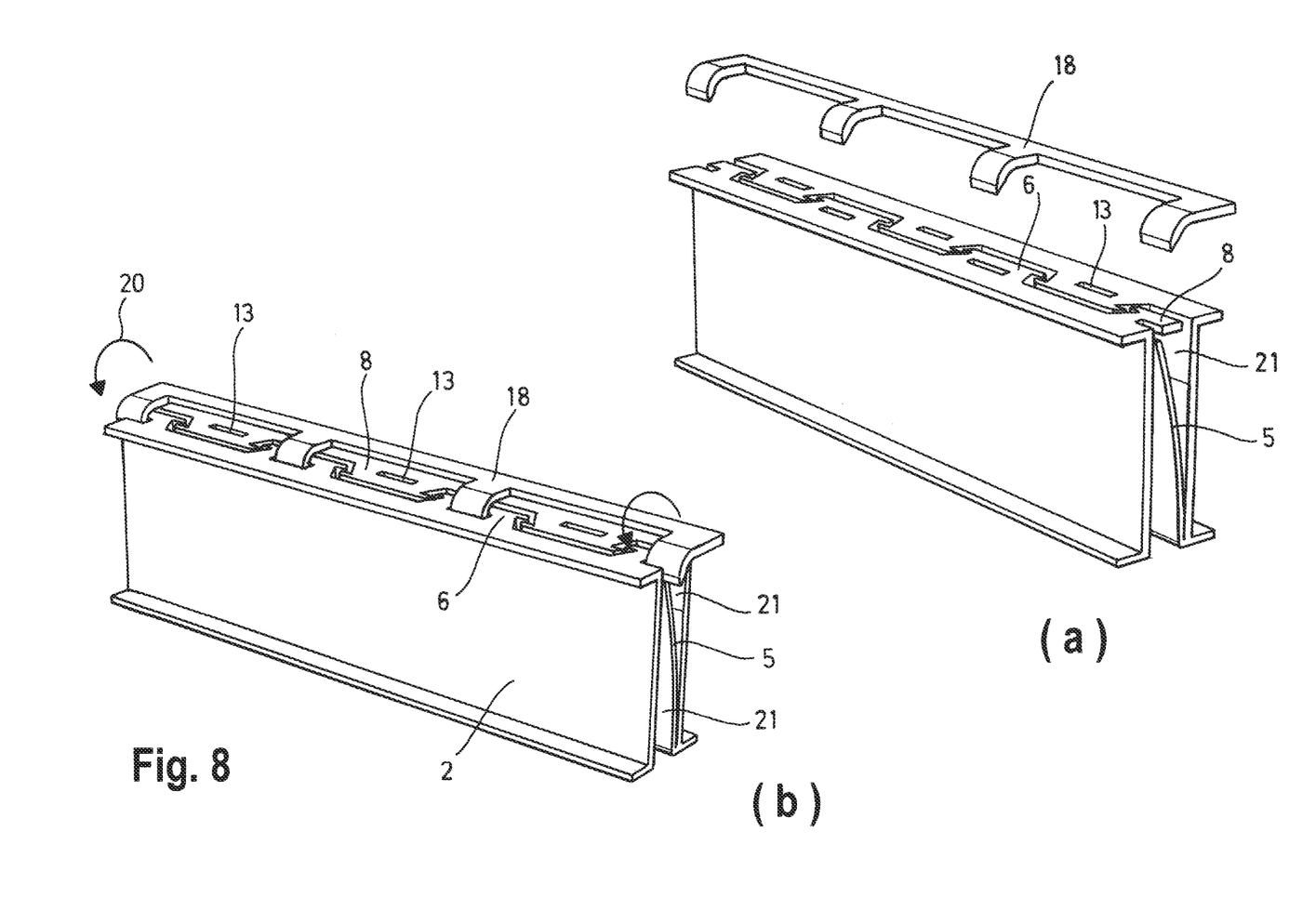

As can easily be seen from FIGS. 5(*a*), 6 and 7, and be derived from FIG. 8, the structure of each spacer 1 may be provided with a plurality of resilient elements 5 and a plurality of restrictors 6 for restricting a movement. The resilient elements 5 and restrictors 6 of a respective structure may alternate each other in a longitudinal direction of that structure. As can be seen in FIGS. 5-8, the structure of each spacer 1 is such that it allows for positioning the structure in a mating condition with the structure of another spacer of the assembly 11. In the mating condition, the resilient element of the structure of one spacer is opposite and interacting with the restrictor of the structure of another spacer of the assembly.

Figure 6:
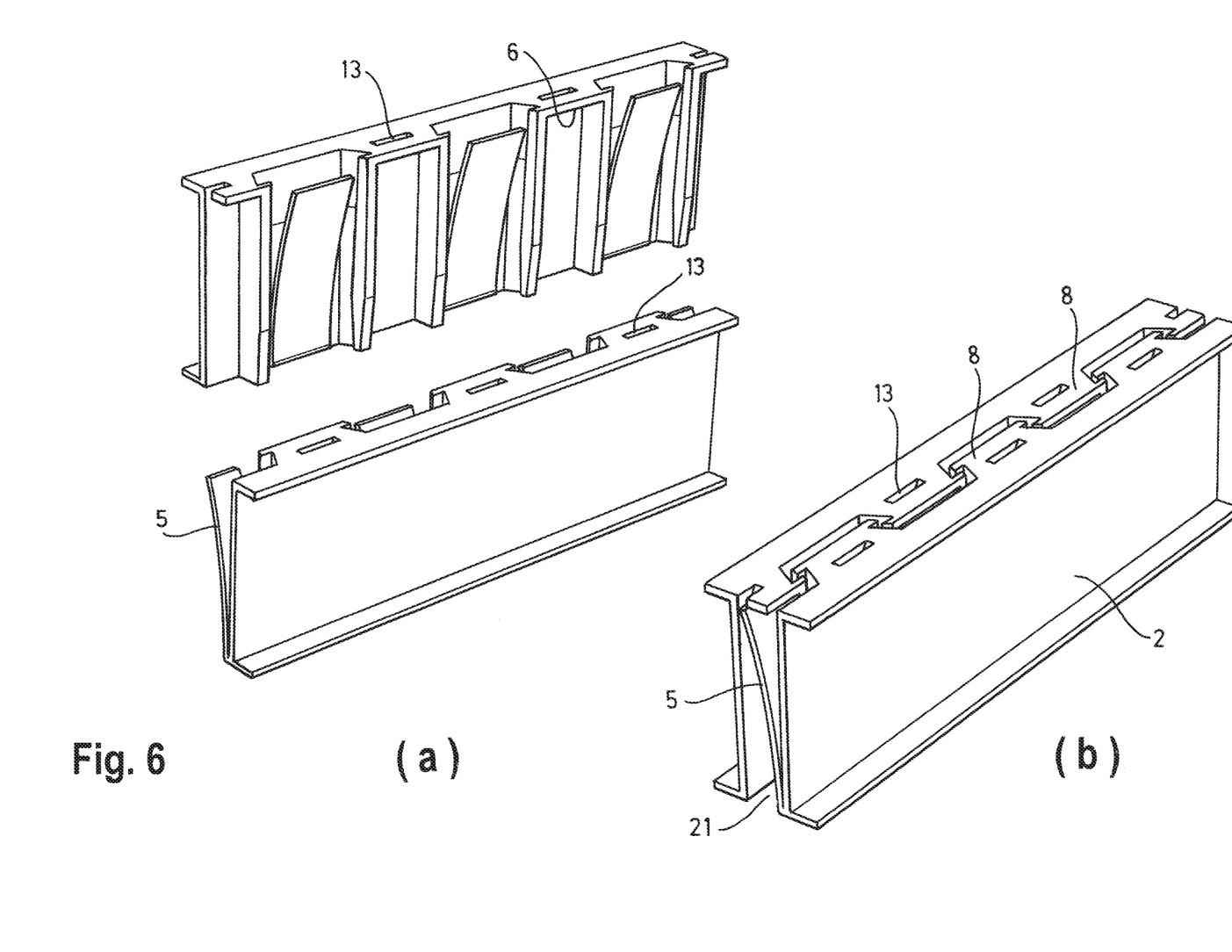

As shown in FIGS. 5 and 6, the structure may be provided with a guiding track and with a counter track for interacting with the guiding track, such that on bringing the structure of one spacer into the mating position with the structure of another spacer, the structure first can be put under an angle relative to the other structure, and can be put in contact, to then let the counter track interact with the guidetrack for reaching the mating condition.

As shown in FIG. 6, the structure may be configured such that in the mating position the structure of one of the spacers 1 is locked into the mating position with the structure of another one of the spacers. The structures are provided with access holes 13 that can be used for access to pawl-shaped resilient element 5 for pushing these such that the mating position as locked can be undone. As shown in more detail in FIG. 8, the structure may thus be configured such that in the mating position the structure is in a mechanically releasable condition. A release tool 18 having "push-back" elements 19 can be used for inserting the tool, such that in each access hole 13 a push-back element 19 fits. On rotating the tool as shown by arrow 20, the pawl-shaped elements 5 are pushed back and the spacers can be unlocked from each other.

As can be seen in FIGS. 3-8, the structure may be provided with a plate-shaped element 8 that in the mating condition extends from a trailing end of the structure and that in the mating condition at least to an extent covers a gap 21 formed by a distance between the mating structures. The plate-shaped element 8 has an outer surface. In the mating condition, a restricted relative movement of the spacers 1 is possible parallel to the outer surface 8. Further, in a mating condition, the outer surfaces of the plate-shaped elements 8 as part of the mating structures remain in the same plane, preventing step-formation on the large surface that is provided by adjacently positioned slab-shaped construction elements FIG. 7 shows an embodiment in which each pawl-shaped resilient element 5 is formed by two spatially separated beams, having between them a pin 17 for interacting with a slot 12 in another spacer 1. This pin-and-slot construction imposes further restrictions on the relative movement of the spacers when in the mating condition.

Although not shown in the Figs., the structure of the spacer may be fixed to the slab-shaped construction element. That is, a slab-shaped construction element is not shown in its entirety in the drawings. However, it is clear that a part of the spacer, part 2, may be a part of a slab-shaped construction element. However, it is also possible that the spacer 1 is an "add-on" element that needs to be added separately to a slab-shaped construction element. In that case, part 2 is likely to be placed against the rim of the construction element.

For the sake of completeness, we point out that the slab-shaped construction element may be a concrete slab, a wall panel, a floatable plastic element, an infiltration unit, and even a road deck element.

The disclosure is not limited to the above-discussed embodiments, many modifications are possible within the framework of the dependent claims.

The invention claimed is:

1. A spacer for construction elements, the spacer comprising:
   a two-part rim having a first part configured to be fixed to a first construction element and a second part configured to be fixed to a second construction element;
   a plurality of elongate resilient elements disposed along a length of each of the rim parts, each elongate resilient element configured to maintain a relative distance between the first construction element and the second construction element when the second construction element is adjacent to the first construction element and in contact with the elongate resilient element by generating a force to urge the first and second construction elements apart in a direction at least partially transverse to a direction of gravity when a distance between the elongate resilient element and the rim part is reduced to a predetermined distance; and
   a corresponding plurality of restrictors disposed along the length of each of the rim parts at alternating positions with the plurality of elongate resilient elements, each restrictor configured to restrict movement between the first and second construction elements in at least one direction different from the direction of the force, wherein each restrictor on the first part of the two-part rim is provided with an abutment surface, the abutment surface being dimensioned and configured to abut a free end of a corresponding elongate resilient element on the second part of the two-part rim.

2. The spacer according to claim 1, wherein the first and second construction elements are slab-shaped construction elements, wherein the first slab-shaped construction element includes two main surfaces and a rim between the two main surfaces and the second construction element is positionable at the rim of the first slab-shaped construction element for maintaining the relative distance to a rim of the second slab-shaped construction element, and for reducing at the relative distance a movement of the rim of the first slab-shaped construction element about a position that is relative to the rim of the second slab-shaped construction element.

3. A spacer for construction elements, the spacer comprising:
   a rim part configured to be fixed to a first construction element;
   a plurality of elongate resilient elements disposed along a length of the rim part, each elongate resilient element configured to maintain a relative distance between the first construction element and a second construction element when the second construction element is adjacent to the first construction element and in contact with the elongate resilient element by generating a force to urge the first and second construction elements apart in a direction at least partially transverse to a direction of gravity when a distance between the elongate resilient element and the rim part is reduced to a predetermined distance; and
   a plurality of restrictors disposed along the length of the rim part at alternating positions with the plurality of elongate resilient elements, each restrictor configured to restrict movement between the first and second construction elements in at least one direction different from the direction of the force;
   wherein at least one of the elongate resilient elements is a pawl being continuously curved along its length.

4. The spacer according to claim 2, wherein at least one of the elongate resilient elements has a free end at or close to the rim of the second slab-shaped construction element.

5. The spacer according to claim 4, wherein the free end is at the predetermined distance.

6. A spacer for construction elements, the spacer comprising:
   a rim part configured to be fixed to a first construction element;
   a plurality of elongate resilient elements disposed along a length of the rim part, each elongate resilient element configured to maintain a relative distance between the first construction element and a second construction element when the second construction element is adjacent to the first construction element and in contact with the elongate resilient element by generating a force to urge the first and second construction elements apart in a direction at least partially transverse to a direction of gravity when a distance between the elongate resilient element and the rim part is reduced to a predetermined distance; and
   a plurality of restrictors disposed along the length of the rim part at alternating positions with the plurality of elongate resilient elements, each restrictor configured to restrict movement between the first and second construction elements in at least one direction different from the direction of the force;
   wherein the first and second construction elements are slab-shaped construction elements, wherein the structure is fixable to the first slab-shaped construction element having two main surfaces and a rim between the two main surfaces, wherein the structure is positionable at the rim of the first slab-shaped construction element for maintaining the relative distance to a rim of the second slab-shaped construction element, and for reducing at the relative distance a movement of the rim of the first slab-shaped construction element about a position that is relative to the rim of the second slab-shaped construction element; and
   wherein at least one of the elongate resilient elements has a free end at or close to the rim of the second slab-shaped construction element; and
   wherein at least one of the elongate resilient elements is a pawl being continuously curved along its length, wherein the free end is a trailing end of the pawl and the trailing end is configured to abut the second construction element, and wherein an opposing end of the pawl is hingedly connected to the first construction element.

7. A spacer for construction elements, the spacer comprising:
   a rim part configured to be fixed to a first construction element;
   a plurality of elongate resilient elements disposed along a length of the rim part, each elongate resilient element configured to maintain a relative distance between the first construction element and a second construction element when the second construction element is adjacent to the first construction element and in contact with the elongate resilient element by generating a force to urge the first and second construction elements apart in a direction at least partially transverse to a direction of gravity when a distance between the elongate resilient element and the rim part is reduced to a predetermined distance; and a plurality of restrictors disposed along the length of the rim part at alternating positions with the plurality of elongate resilient elements, each restrictor configured to restrict movement between the first and second construction elements in at least one direction different from the direction of the force;

wherein the first and second construction elements are slab-shaped construction elements, wherein at least one of the plurality of restrictors is configured to block movement of a free end of at least one of the plurality of elongate resilient elements of a structure that is fixed to a rim of the second slab-shaped construction element, and wherein at least one of the elongate resilient elements is a pawl being continuously curved along its length.

8. The spacer according to claim 7, wherein the at least one restrictor is positioned at the free end of the pawl such that the at least one restrictor is configured to abut the second construction element, and wherein the opposing end of the pawl is hingedly connected to the first construction element.

9. The spacer according to claim 1, wherein the spacer is one of the spacers of an assembly having at least two of such spacers.

10. The spacer according to claim 9, wherein each spacer is dimensioned and configured such that it allows for positioning at least one spacer in a mating condition with another spacer of the assembly.

11. The spacer according to claim 10, wherein in the mating condition, the resilient element of one spacer is opposite and interacting with the restrictor of another spacer of the assembly.

12. A spacer for construction elements, the spacer comprising:
   a rim part configured to be fixed to a first construction element;
   a plurality of elongate resilient elements disposed along a length of the rim part, each elongate resilient element configured to maintain a relative distance between the first construction element and a second construction element when the second construction element is adjacent to the first construction element and in contact with the elongate resilient element by generating a force to urge the first and second construction elements apart in a direction at least partially transverse to a direction of gravity when a distance between the elongate resilient element and the rim part is reduced to a predetermined distance; and
   a plurality of restrictors disposed along the length of the rim part at alternating positions with the plurality of elongate resilient elements, each restrictor configured to restrict movement between the first and second construction elements in at least one direction different from the direction of the force;
   wherein the spacer is one of the spacers of an assembly having at least two of such spacers;
   wherein each spacer is dimensioned and configured such that it allows for positioning at least one spacer in a mating condition with another spacer of the assembly;
   wherein in the mating condition, the resilient element of one spacer is opposite and interacting with the restrictor of another spacer of the assembly; and
   wherein each spacer is provided with a guiding track and with a counter track for interacting with the guiding track, such that on bringing a first spacer into the mating position with a second spacer, the first spacer is engaged with the second spacer at an initial angle relative to the second spacer to then let the counter track of the first spacer interact with the guiding track of the second spacer and to let the counter track of the second spacer interact with the guiding track of the first spacer for reaching the mating condition.

13. The spacer according to claim 10, wherein in the mating position one of the spacers is locked into the mating position with another one of the spacers.

14. The spacer according to claim 10, wherein in the mating position the spacers are in a mechanically releasable condition.

15. The spacer according to claim 10, further comprising a plate-shaped element that, when the spacer is in the mating condition, extends from a trailing end of the spacer and at least to an extent covers a gap formed by distance between mating spacers.

16. The spacer according to claim 10, wherein the plate-shaped element has an outer surface, and wherein when the spacer is in the mating condition a restricted movement of the spacer is possible parallel to the outer surface of the plate-shaped element.

17. The spacer according to claim 16, wherein in the mating condition, the outer surfaces of the plate-shaped elements as part of the mating spacers remain in the same plane.

18. The spacer according to claim 2, wherein the spacer is fixed to the slab-shaped construction element.

19. The spacer according to claim 1, wherein the slab-shaped construction element is one of a concrete slab, a wall panel, a floatable plastic element, an infiltration unit, a road-deck element.

* * * * *